United States Patent [19]

Hensel et al.

[11] Patent Number: 4,687,699
[45] Date of Patent: Aug. 18, 1987

[54] ABRASION-RESISTANT, COPOLYESTER CARRIER FILM FOR MAGNETIC INFORMATION MEDIA

[75] Inventors: Hartmut Hensel, Schlangenbad; Hermann Dallmann, Wiesbaden, both of Fed. Rep. of Germany

[73] Assignee: Hoechst Aktiengesellschaft, Frankfurt, Fed. Rep. of Germany

[21] Appl. No.: 723,696

[22] Filed: Apr. 16, 1985

[30] Foreign Application Priority Data

Apr. 16, 1984 [DE] Fed. Rep. of Germany ....... 3414310

[51] Int. Cl.$^4$ ...................... B32B 31/30; B32B 31/20; B32B 27/36
[52] U.S. Cl. ............................... 428/213; 156/244.11; 156/244.24; 428/323; 428/336; 428/480; 428/694; 428/900; 428/910
[58] Field of Search ............... 428/213, 215, 323, 480, 428/694, 900, 910; 156/244.11, 244.24

[56] References Cited

U.S. PATENT DOCUMENTS

| 4,198,458 | 4/1980 | Mitsuishi et al. | 428/212 |
|---|---|---|---|
| 4,375,494 | 3/1983 | Stokes | 428/323 |
| 4,550,049 | 10/1985 | Ono et al. | 428/695 |
| 4,568,599 | 2/1986 | Ono et al. | 428/695 |

FOREIGN PATENT DOCUMENTS

| 3019073 | 3/1979 | Fed. Rep. of Germany | 521/54 |
|---|---|---|---|
| 2133895 | 4/1980 | Fed. Rep. of Germany | 260/40 R |
| 2647713 | 5/1980 | Fed. Rep. of Germany | . |

Primary Examiner—Paul J. Thibodeau
Attorney, Agent, or Firm—James C. Lydon

[57] ABSTRACT

An abrasion-resistant, multilayer biaxially oriented carrier film for magnetic information media produced by coextrusion is described, said film being composed of a base layer (A) comprising a thermoplastic polymer matrix of essentially linear aromatic polyester, containing finely distributed solid particles to improve its surface roughness which determines the slip properties of the film, and of at least one cover layer (B) applied to one of the two surfaces of base layer (A). The characterizing features of the carrier film described consist in the fact that base layer (A) contains the solid particles in an an amount from 0.001 wt. % to 10 wt. %, based on the weight of the polymer forming base layer (A), whereby the average particle size of the solid particles lies in the range from 0.001 to 20 microns, by the fact that cover layer (B) comprises a thermoplastic polymer matrix of essentially linear aromatic copolyester, in which finely distributed solid particles are embedded in a quantity between 0 and 10 wt. %, based on the weight of the polymer forming cover layer (B), whereby the solid particles have an average particle diameter of less than 0.3 micron, and by the fact that the layer thickness of cover layer (B) is a maximum of 40% of the layer thickness of base layer (A).

16 Claims, No Drawings

ABRASION-RESISTANT, COPOLYESTER CARRIER FILM FOR MAGNETIC INFORMATION MEDIA

BACKGROUND OF THE INVENTION

The invention relates to an abrasion-resistant, multilayer, biaxially oriented carrier film for magnetic information media, composed of a base layer A, comprising a thermoplastic polymer matrix made of essentially linear aromatic polyester, containing finely distributed solid particles to improve its surface roughness, which determines the slip properties of the film, and of at least one copolyester cover layer B, applied to one of the two surfaces of base layer A.

Biaxially oriented films of polyesters, especially polyethylene terephthalate, because of their superior properties such as tensile strength, tear resistance, modulus of elasticity, transparency, chemical resistance, thermal resistance and the like are widely used in many many technical areas especially for magnetic recording media.

The polyester films, however, must have a specific combination of properties. Thus, polyester films to be processed into magnetic tapes to be used for audio, video, or computer technology must have a low coefficient of friction and a high abrasion resistance and must be insensitive to deterioration of their electromagnetic transmission properties.

To improve the properties of polyester films, methods are already known for incorporating fine particles of an inert material in the films, for example by using one of the methods listed below:

(1) In general the residue of metallic compounds, used as re-esterification catalysts, is precipitated in the system by special measures in the form of finely distributed particles (called the "precipitation method"); and/or
(2) Microparticles of an inorganic or organic compound with different particle sizes are added from the exterior (called the "addition method").

Single-layer films, containing organic particles in a fine distribution, are described, for example, in German Offenlegungsschrift No. 30 19 073. Films containing inorganic particles to improve their slip properties are described in German Auslegeschrift No. 21 33 895 and German Pat. No.26 47 713. These films are single-layer films and therefore have a surface roughness on both surfaces which depends upon the quantity of particles added in each case as well as the particle diameter.

To reduce the surface roughness on the surface of the film intended to receive a magnetic coating, multilayer films are also manufactured consisting of a first layer of thermoplastic polymer without particles added, which has a comparatively smooth surface, and a second thinner layer, provided in the usual fashion with particles.

It has been found that the greatest disadvantage of particles incorporated into conventional polyester films for the purpose of improving the slip properties of the film lies in their lack of affinity for the polymer material and their tendency to form agglomerates. For this reason, the friction between such conventional films with one another or between such a film and another material causes the particles to be removed from the film or films, leading for example to the formation of white dust or deposits on the films which are used for magnetic tapes. These deposits are highly undesirable since they are deposited in the equipment for playing the magnetic tapes, causing damage thereto.

If the particles which are normally distributed uniformly in the polymers forming the individual layers are deposited very close to the surface of the layer, friction during winding or rewinding of tapes already provided on one side with a magnetic coating or of films which have not yet been coated readily leads to separation of the polymer layer flakes covering the particles, which are extremely thin, and to release of the embedded particles. The extremely thin polymer layer flakes however adhere very tightly by electrostatic charge either to the film or to the applied magnetic layer, leading to extremely undesirable disturbing effects, to adhesion losses if the magnetic coating had not yet been applied before the flakes came loose, or to signal losses if the magnetic coating had already been applied before the flakes came loose. In addition, the released solid particles penetrate the magnetic coating causing deformations and eventually, signal losses or distortions as well.

It has also been found in practice that scratches form under mechanical stress in the surfaces of films including those films not provided with embedded particles, and that small polymer particles are released from the film in the vicinity of these scratches and can also cause the disadvantages already mentioned hereinabove.

These disturbing effects, generally covered by the term "abrasion behavior" can, in the least favorable case, render magnetic tapes manufactured from the carrier materials listed useless for their designated use as video, audio, or computer tapes. The same applies to flexible disks or floppy disks.

Therefore the object of the present invention is to proceed on the basis of the demonstrated state of the art to provide a carrier film for magnetic information media, which (1) has a low surface roughness on the surface designated to receive the magnetic coating, (2) has a relatively high surface roughness which determines the slip properties on the surface opposite the magnetic coating, (3) has sufficiently high strength lengthwise and crosswise to allow manufacture of extremely thin tapes with extremely high signal density, and (4) exhibits an excellent abrasion behavior, so that even when subjected to extreme frictional stress, no deposits can be seen on the film or magnetic coating surface.

SUMMARY OF THE INVENTION

The present invention relates to an abrasion-resistant, multilayer, biaxially oriented carrier film for magnetic information media comprising
(i) a polyester substrate layer having from 0.001 weight percent to 10 weight percent, based upon the weight of the polymer forming said substrate layer, of finely distributed solid particles having an average particle size of from 0.001 to 20 microns; and
(ii) a copolyester cover layer applied to at least one of the two surfaces of said polyester substrate, said copolyester cover layer having a maximum thickness of 40% of the thickness of said polyester substrate, and having from 0 to 10 weight percent, based upon the weight of the polymer forming said copolyester cover layer, of finely distributed solid particles having an average particle diameter of less than 0.3 micron.

The present invention also relates to a coextrusion process for manufacture of an abrasion-resistant film having a polyester substrate and at least one copolyester cover layer applied thereto, said film manufactured by a coextrusion process comprising
(i) separately plasticizing the polyester and copolyester resins which are to form the layers of said film;
(ii) combining said plasticized resins and extruding said resins in sheet-like form through a coextrusion nozzle;
(iii) contacting the combined, multilayer extrudate upon a cooling roller, thereby cooling said extrudate in an unstretched state;
(iv) biaxially orienting said cooled multilayer extrudate to form a multilayer polyester film;
(v) heat-fixing said biaxially oriented polyester film, with the proviso that the thickness of said copolyester cover layer may be varied by either
(A) regulating the speed at which the plasticized polyester resins are permitted to pass to said co-extrusion nozzle, or
(B) regulating the speeds of the extruders.

DETAILED DESCRIPTION OF THE INVENTION

As summarized above, the object of the present invention is achieved by a carrier film belonging to the species recited hereinabove, whose characterizing features lie in the fact that the base layer A contains solid particles in an amount of 0.001 wt. % to 10 wt. %, based on the weight of the polymer forming base layer A, whereby the average particle size of the solid particles lies in the range from 0.001 to 20 microns, by the fact that cover layer B comprises a thermoplastic polymer matrix of essentially linear aromatic copolyester, in which finely distributed solid particles are embedded in a quantity from 0 to 10 wt. %, based on the weight of the polymer forming cover layer B, whereby the solid particles have an average particle diameter of less than 0.3 micron, and by the fact that the layer thickness of cover layer B is a maximum of 40% of the layer thickness of base layer A.

Base layer A can comprise polyester homopolymers, obtained by polycondensation of ethylene glycol for example, with terephthalic acid or naphtholinic acid. Layer A can also be composed of mixtures of various polyesters as well as mixtures or blends of polyester homopolymers with other polymers as for example polyolefin homo- or copolymers, polyamides, polycarbonates, iononers, etc. Preferably layer A comprises polyethylene terephthalate. It contains finely distributed solid particles in an amount of preferably 0.001 to 5 wt. %, especially preferably from 0.001 to 1 wt. %, always based on the weight of the polyester forming base layer A. The particles can be of an inorganic or an organic material, but they can also be precipitates of catalyst residues or mixtures of all three types of particles. Examples are one or more of the following materials: silicon dioxide, as for example hydrophobic pyrogenic silicic acid; natural silicon dioxide and diatomaceous earth silicon dioxide; synthetic and natural silicates such as kaolin; natural and pyrogenic aluminum oxide and aluminum hydroxide; calcium carbonate; barium sulfate; titanium dioxide; carbon black; metal particles as for example those of aluminum, copper, iron, and the like; magnetic particles as for example barium ferrite; particles of polymer materials as for example plastomers, elastomers, and duromers.

The particles can additionally be coated with an adhesion promoter for better adhesion to the matrix.

The finely distributed particles have an average particle size of preferably 0.01 to 15 microns, especially preferably from 0.1 to 10 microns.

Cover layer B is applied to at least one of the surfaces of base layer A. Cover layer B has a layer thickness less than the layer thickness of base layer A, preferably cover layer B has a thickness of 30% maximum, especially preferably a maximum of 15% of the layer thickness of base layer A. Cover layer B comprises a statistical copolyester of ethylene terephthalate units and additional ester components. The diol components used for the other ester components can be for example diethylene glycol, propylene glycol, p-xylylene glycol, 1,4-cyclohexanedimethanol; the acid components can be for example adipic acid, sebacic acid, phthalic acid, isophthalic acid, 2,6-naphtholene dicarbonic acid, 5-sodium sulfoisophthalic acid, or polyfunctional acids such as trimelittic acid or pyromelittic acid. Especially preferably the cover layer comprises a copolyester of polyethylene terephthalate/isophthalate with an isophthalate unit content of at least 5 wt. % based on the total weight of the copolyester, preferably of at least 15 wt. %, especially preferably in the range from 15 to 25 wt. %, in which very finely distributed solid particles in an amount from preferably 0 to 5 wt. %, especially preferably 0 to 2 wt. %, very especially preferably 0 wt. %, always based on the weight of the copolyester forming cover layer B, are embedded. The solid particles have a particle diameter of preferably on average less than 0.2 micron, especially preferably less than 0.1 micron.

The solid particles can comprise the same materials as already described for base layer A, but the same particles need not always be used for the base layer and the cover layer, but particles of other materials than those incorporated in the base layer may be used for the cover layer.

Cover layer B is intended to cover the surface roughness of particles influencing base layer A, said particles being contained in base layer A, to the point where two conditions are fulfilled:
1. The surface roughness remaining after layer B is applied, which is caused by the particle-produced surface structuring of layer A, said structuring projecting partially through cover layer B or which in any case causing a certain surface structuring of cover layer B as well, must be sufficiently great that frictional characteristics of the film result therefrom which have a positive influence both on the winding of the film and on the running behavior of magnetic tapes made from the film.
2. The particles must be sufficiently far removed from the free surface of cover layer B to prevent the particles from being torn loose and thus prevent abrasion.

The copolyester of cover layer B also acts to prevent polymer particles from being torn loose from the matrix of cover layer B when the film is subjected to mechanical stress when magnetic tapes are played or rewound as intended, with possible formation of scratches.

In a special embodiment of the invention, the film has a three-layered structure, comprising a base layer A, in which cover layers B, B' are applied to both surfaces. The base layer thus has the composition described already in the above description. A unilaterally coated film has a very specific surface roughness on the side opposite cover layer B which depends on the quantity of particles added in each case as well as the average particle diameter of the particles added. However, the magnetic coating should be applied to a film surface which is essentially free of irregularities, so that the magnetic coating would not be influenced by the roughness of the substrate and will have as uniform layer thickness as possible. This is intended primarily to prevent signal losses from occurring when the tapes are played at points where the layer thickness is less.

In order to offer a smooth surface to the magnetic coating, according to the present invention both surfaces of base layer A are coated with cover layers B and B' of the composition described hereinabove. The layer thickness of cover layer B', which is applied to that side of the base layer intended to receive the magnetic coating, is selected so that the irregularities which are present because of the particles contained in base layer A at the surface of base layer A are markedly reduced in the surface of cover layer B'. Preferably the layer thickness of cover layer B' on the side of the carrier film intended to be coated with the magnetic coating is 0.1 to 3 microns and especially preferably 0.1 to 2 microns.

Cover layer B' in the especially preferred embodiment of the invention comprises the copolyester already used for cover layer B applied to the side of the carrier film opposite the one intended to receive the magnetic coating, but it can also be formed of another copolyester into which no solid particles have been incorporated. However, in order to produce a low surface roughness that influences the playing and winding characteristics of the film, solid particles with the specified particle size of less than 0.3 micron can be present in cover layer B'.

Cover layer B, which is applied on the side of base layer A opposite the surface to which the magnetic coating is to be applied, should therefore have a layer thickness applied to it such that the surface structure of the base layer beneath it can still be detected; preferably the layer thickness is 0.1 to 1 micron and especially preferably 0.1 to 0.5 micron. Cover layer B can then comprise the copolyester of the specified compositions, which contains no solid particles; however in order to achieve a surface partial restructuring in individual cases, solid particles with the specified particle size of less than 0.3 micron can also be present in cover layer B.

At least one of the layers can also contain additives such as slip and slide agents, antistatic agents, antioxidants, and the like which have a positive effect on the characteristics of the film.

The carrier film described hereinabove is produced by the extrusion method, preferably by the coextrusion method. In this method, the polymers forming the individual layers of the carrier film are plasticized in separate extruders, fed via separate melt lines, and then extruded onto a cooling roller by means of a nozzle, after which the unstretched film is cooled. After cooling, the film is oriented in known fashion by multiple stretching lengthwise and crosswise, heat-fixed, cut, and wound. The characterizing feature of this method lies in the fact that the layer thickness(es) of cover layer(s) B, B' can be varied during the manufacturing process. The layer thickness(es) of the cover layer(s) B, B' is/are varied preferably by regulating the feed of the melts of the polymers forming cover layer(s) B, B' to the melt lines to the coextrusion nozzle, but the layer thickness(es) can also be varied by regulating the rpm of the assemblies provided for plasticizing and feeding the polymers forming cover layer(s) B, B'.

In a preferred embodiment of the manufacturing process, the process feature recited hereinabove is combined with a fixed temperature setting during the heat-setting stage. Heat-setting is performed essentially to give the film a good dimensional stability. In order additionally to have an advantageous effect on the properties of the cover layer(s) as regards improved abrasion resistance, it has been found especially favorable in practice to set the temperature for heat-setting above 200° C., preferably above 210° C. Especially preferably the film, after treatment at the temperature recited hereinabove, should be cooled as rapidly as possible to a temperature of a maximum of 70° C. This method is also referred to as quenching.

The method recited hereinabove gives the individual skilled in the art a simple tool for manufacturing films with a wide variety of surface characteristics. Films can be produced with an essentially smooth surface on both sides, wherein the layer thicknesses of the cover layers B, B' applied to both sides can be set such that structures present on the surfaces of base layer A are covered over, and films can also be produced having one essentially smooth surface and one surface which is relatively rough by comparison to the former, whereby one of the layer thicknesses of the cover layers can be made sufficiently great that all the structures present on base layer A are covered, and in which the layer thickness of the other cover layer is made so small that structures in base layer A are still clearly evident on the surface of the cover layer.

EXAMPLES

The embodiments described hereinbelow are illustrative only and are intended to further illustrate the invention in greater detail, especially by comparison with the state of the art, without, however, in any way limiting the scope of the invention.

EXAMPLE 1 (COMPARISON EXAMPLE)

A polyester having 0.3 wt. % (based on the weight of the polyester) of uniformly distributed organic particles of $BaSO_4$ with an average particle diameter of 1.0 micron is extruded as a monofilm with a layer thickness of 180 microns and cooled on a cooling roller. The resultant prefilm is heated to 82° C. by rollers and stretched lengthwise in a nip between two rollers by a factor of 3.5 and cooled immediately, then heated to 110° C. and stretched crosswise by a factor of 3.4.

The biaxially stretched film thus produced is exposed to a temperature of 230° C. for approximately 2 seconds and then cooled to a temperature below 50° C. at the rate of about 100° C. per second. It has nearly the same mechanical properties lengthwise and crosswise and is about 15 microns thick.

EXAMPLES 2 TO 8 (ACCORDING TO THE INVENTION)

A polyester according to Example 1 and a copolyester consisting of polyethylene terephthalate/isophthalate with 18% isophthalate, without particles added, are melted separately by extruders, fed to a three-layer nozzle by means of two gear pumps (metering pumps), and extruded in such fashion that the copolyester covers the polyester according to Example 1 with an equal layer thickness on both the upper and lower surfaces.

The combined flow thus produced is processed in the same fashion as in Example 1, but this time as a three-layer multilayer film, to produce films 15 microns thick.

During the manufacture of the multilayer film, the layer thicknesses of the cover layers are adjusted in the following fashion on both sides by regulating the rpm of the gear pumps:

| Example | 2 | 3 | 4 | 5 | 6 | 7 | 8 |
|---|---|---|---|---|---|---|---|
| Layer thickness (microns) | 0.2 | 0.3 | 0.5 | 1.0 | 1.5 | 2.0 | 2.5 |

The total thickness of the films is 15 microns each.
The resultant films can be referred to as symmetric (BAB) films.
The films of Examples 1 and 2 to 8 were subjected to the following tests:
(a) sliding friction according to DIN 53375,
(b) roughness measurement of the surfaces according to DIN 4768 (cut off: 0.25 mm),
(c) abrasion test using an instrument of our own design.

A. Sliding Friction

The results of the measurements of sliding friction are summarized in Table I below:

TABLE I

| Example | Sliding Friction |
|---|---|
| 1 | 0.34 |
| 2 | 0.40 |
| 3 | 0.50 |
| 4 | 1.5 |
| 5 | >1.5 (jammed) |
| 6 | >1.5 (jammed) |
| 7 | >1.5 (jammed) |
| 8 | >1.5 (jammed) |

The film according to Example 1 has a coefficient of sliding friction of 0.34. The surface of the base layer can be covered with a cover layer with a thickness of approximately 0.2 micron without the sliding friction behavior of the resultant film changing significantly by comparison with an uncoated film. Even with a layer of 0.3 micron (Example 3), no serious disadvantageous effect can be seen.

It is only when the cover layer reaches a thickness of 1.0 micron or more (Examples 5 to 8) that the surface of the film changes in such a fashion that it corresponds in its slip behavior to a film without any particles added whatever, in which "jamming" can therefore be seen.

B. Surface Roughness

The results of the measurements of surface roughness are summarized in Table II below:

TABLE II

| Example | $R_t$ (microns) | $R_a$ (microns) |
|---|---|---|
| 1 | 0.8 | 0.06 |
| 2 | 0.73 | 0.052 |
| 3 | 0.65 | 0.045 |
| 4 | 0.52 | 0.033 |
| 5 | 0.23 | 0.016 |
| 6 | 0.21 | 0.015 |
| 7 | 0.21 | 0.015 |
| 8 | 0.21 | 0.015 |

As Table II shows, the surface roughness of the film can be changed considerably by varying the layer thickness of the cover layers without adding any particles whatever. When the layer thickness is 1.5 microns or more, no further changes are possible.

In conjunction with the sliding friction behavior discussed above, the surface roughness ($R_t/R_a$), which influences the quality of the magnetic signal can be varied within the range of a layer thickness of the cover layers from 0.0 to 0.5 micron without any disadvantageous loss of sliding friction in the values listed in Table II.

C. Abrasion Resistance

The abrasion behavior of the films produced according to the examples was tested on a measuring device in which a 12.5 mm wide film strip with a constant web tension (1 N) was pulled over a friction roller (fixed deflecting roller from a magnetic tape cassette), then guided over to rubber rollers serving as measuring rollers and then wound. The load on the rubber rollers was evaluated on a scale running from 1, corresponding to very little abrasion, to 6, corresponding to a great deal of abrasion. The measurement results are summarized in Table III below.

TABLE III

| Example | Abrasion |
|---|---|
| 1 | 6 |
| 2 | 2 |
| 3 | 1 |
| 4 | 1 |
| 5 | 1 |
| 6 | — (4) |
| 7 | — |
| 8 | — |

The measured values listed represent the averages of 10 individual measurements.

As the layer thickness of the cover layers increases, an improvement in abrasion behavior can be seen. In Examples 6 to 8, however, no clear results could be obtained since the film jammed on the friction rollers and constant web tension could no longer be maintained.

We claim:

1. An abrasion-resistant, multilayer, biaxially oriented carrier film for magnetic information media, comprising
   (i) a polyester substrate layer having from 0.001 weight percent to 10 weight percent, based upon the weight of the polyester forming said substrate layer, of solid particles having an average particle size of from 0.001 to 20 microns, said particles being finely distributed throughout said substrate layer; and
   (ii) a cover layer applied to each of the two surfaces of said polyester substrate, said cover layer being a copolyester cover layer having a maximum thickness of 40% of the thickness of said polyester substrate.

2. The abrasion-resistant, multilayer carrier film of claim 1 wherein said copolyester cover layer has a maximum thickness of 30% of the thickness of said polyester substrate.

3. The abrasion-resistant, multilayer carrier film of claim 2 wherein said copolyester cover layer has a maximum thickness of 15% of the thickness of said polyester substrate.

4. The abrasion-resistant, multilayer carrier film of claim 1 wherein said polyester substrate layer comprises polyethylene terephthalate having from 0.001 to 5 weight percent, based upon the weight of the polyethylene terephthalate forming said polyester substrate layer, of said solid particles.

5. The abrasion-resistant, multilayer carrier film of claim 1 wherein said solid particles, finely distributed throughout said polyester substrate, have an average particle size of from 0.01 to 15 microns.

6. The abrasion-resistant, multilayer carrier film of claim 5 wherein said solid particles have an average particle size of from 0.1 to 10.0 microns.

7. The abrasion-resistant, multilayer carrier film of claim 1, wherein said copolyester cover layer is a copolyester of polyethylene terephthalate/isophthalate having from 5 to 25 weight percent isophthalate based upon the total weight of the copolyester.

8. The abrasion-resistant, multilayer carrier film of claim 1 wherein said copolyester cover layer contains up to 5 weight percent of solid particles distributed throughout said copolyester cover layer having an average particle size of less than 0.2 micron.

9. The abrasion-resistant, multilayer carrier film of claim 7 wherein at least one of said copolyester cover layers, the layer intended to receive a magnetic coating, has a thickness of from 0.5 to 3 microns.

10. The abrasion-resistant, multilayer carrier film of claim 9 wherein the copolyester cover layer, which is opposite the copolyester cover layer intended to receive said magnetic coating, has a thickness of from 0.1 to 1 micron.

11. The abrasion-resistant film of claim 6 wherein said solid particles possess an average particle size of about 1 micron.

12. The abrasion-resistant film of claim 6 wherein said solid particles are selected from the group consisting of silicon dioxide, aluminum dioxide, aluminum hydroxide, calcium carbonate, barium sulfate, and carbon black.

13. The abrasion-resistant film of claim 12 wherein said solid particles comprise barium sulfate.

14. The abrasion-resistant, multilayer film of claim 1 wherein
(i) both cover layers are copolyester cover layers which contain 5 to 25 weight percent isophalate based upon the total weight of the copolyester,
(ii) said polyester substrate layer contains about 0.3 weight percent of solid particles selected from the group consisting of silicon dioxide, aluminum dioxide, aluminum hydroxide, calcium carbonate, barium sulfate, and carbon black, and said particles have an average particle size of about 1.0 micron,
(iii) the total thickness of the multilayer film is approximately 15 microns thick, with the individual thickness of said copolyester cover layers ranging from about 0.2 to about 1.5 microns.

15. A process for manufacture of an adhesion-resistant, multilayer carrier film having a central polyester substrate containing from 0.001 to 10 weight percent, based upon the weight of polymer of solid particles having an average size of from 0.001 to 20 microns and two copolyester cover layers said film manufactured by a coextrusion process comprising
(i) separately plasticizing the polyester and copolyester resins which are to form the layers of said film;
(ii) combining said plasticized resins and extruding said resins in sheet-like form through a coextrusion nozzle;
(iii) contacting the combined, multilayer extrudate upon a cooling roller, thereby cooling said extrudate in an unstretched state;
(iv) biaxially orienting said cooled, multilayer extrudate to form a multilayer polyester film;
(v) heat-fixing said biaxially oriented polyester film;
with proviso that the thickness of said copolyester cover layers is varied by either:
(A) regulating the speed at which the plasticized polyester and copolyester resins are permitted to pass to said coextrusion nozzle, or
(B) regulating the speed of the extruders
so that said copolyester cover layers have maximum thickness of 40% of the thickness of said polyester substrate.

16. The process of claim 15 wherein said heat-setting is carried out at a temperature above 200° C. and further comprising a subsequent quenching step wherein the film is rapidly cooled to a maximum temperature of 50° C., immediately after heat-setting is completed.

* * * * *